US012361116B1

(12) United States Patent
Woodley

(10) Patent No.: US 12,361,116 B1
(45) Date of Patent: Jul. 15, 2025

(54) PROTECT SOFTWARE PROGRAM AUDIT/LOG MESSAGES IN SOFTWARE CODE, IN EXECUTABLE FILE, AND DURING RUNTIME EXECUTION

(71) Applicant: Bryan Hugh Woodley, Warrenton, VA (US)

(72) Inventor: Bryan Hugh Woodley, Warrenton, VA (US)

(73) Assignee: Bryan Hugh Woodley, Warrenton, VA (US)

( * ) Notice: Subject to any disclaimer, the term of this patent is extended or adjusted under 35 U.S.C. 154(b) by 114 days.

(21) Appl. No.: 17/963,390

(22) Filed: Oct. 11, 2022

Related U.S. Application Data

(60) Provisional application No. 63/254,181, filed on Oct. 11, 2021.

(51) Int. Cl.
*G06F 21/52* (2013.01)
*G06F 8/77* (2018.01)
*G06F 21/60* (2013.01)

(52) U.S. Cl.
CPC ............... *G06F 21/52* (2013.01); *G06F 8/77* (2013.01); *G06F 21/60* (2013.01); *G06F 2221/033* (2013.01)

(58) Field of Classification Search
None
See application file for complete search history.

*Primary Examiner* — Brian Whipple

(57) ABSTRACT

This present processor-implemented method provides a solution that protects software program audit/log messages during: development of software programs, generation of software program executables, and runtime execution of software program executables. The method separates audit/log messages from software programs, and represents audit/log messages as id=value pairs, where the id is an identifier and the value is an audit/log message string text. To protect and prevent extraction of string text, the method uses the id elements in the development of software programs and generation of software program executables. The method protects and stores string text in a fixed size storage during runtime execution. During runtime execution the method uses the string text to identify and extract audit/log message arguments, protects, and stores them in fixed size circular queues storage. To prevent loss of audit/log messages the method continuously saves the content of fixed size storage and fixed size circular queues storage.

14 Claims, 2 Drawing Sheets

Comprising method data flow

1. Example to represent audit/log messages as id=value pairs used in Example 2:

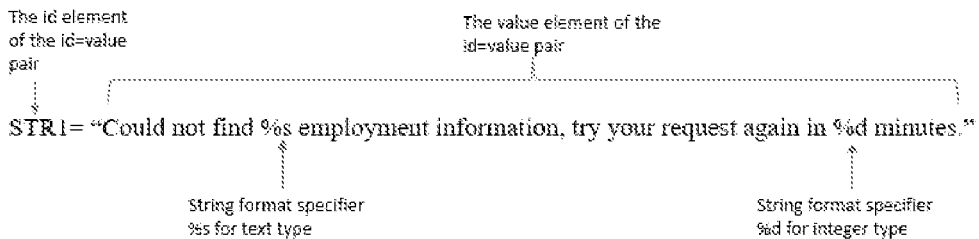

2. Example using API function call with id, text, and integer arguments to produce audit/log message in Example 3:

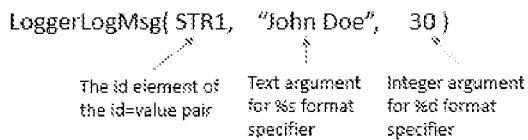

3. Example to generate readable and formatted output for the audit/log message from Example 2:

"Could not find John Doe employment information, try your request again in 30 minutes."

Figure 1: Examples for id=value pairs, function call, and message output

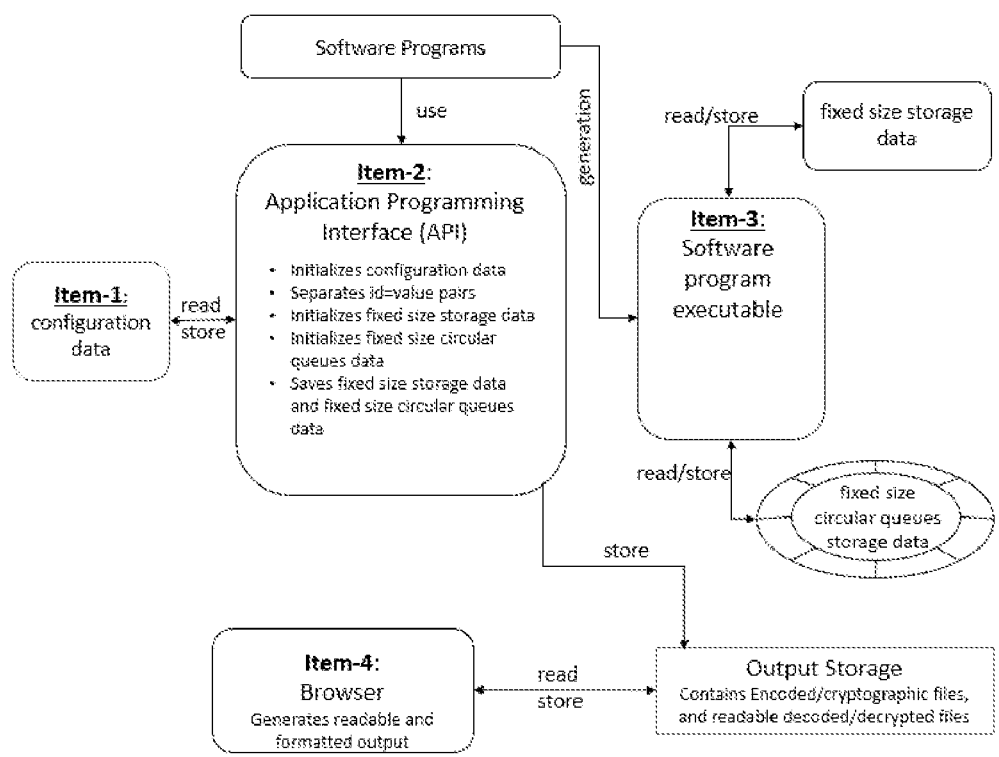
Figure 2: Comprising method data flow

PROTECT SOFTWARE PROGRAM AUDIT/LOG MESSAGES IN SOFTWARE CODE, IN EXECUTABLE FILE, AND DURING RUNTIME EXECUTION

CROSS-REFERENCE TO RELATED APPLICATIONS

Not Applicable

BACKGROUND

This present invention relates to the field of computing, and, more particularly, to protecting software program audit/log messages.

Software programs often use application programming interface (API) functions to generate audit/log messages that contain critical and sensitive information about the execution flow of the software program and the data it uses during execution. To reduce the exposure of critical and sensitive information, the audit/log messages should be protected during the development of the software programs, during the generation of software program executables, and during runtime execution of executables.

Current approaches to protect software program audit/log messages have been limited to protecting audit/log messages after the software program has generated the audit/log messages and saved to external storage, such as files on disk devices. Current approaches do not provide an integrated solution to protect audit/log messages during the development of software programs, during the generation of software program executables, and during runtime execution of software program executables. With current approaches, software program audit/log messages can be easily identified and extracted from software program source code during development. In addition, during the generation of software program executables, audit/log messages are embedded in the executables and can be reversed engineered and extracted from software program executables, and during the runtime execution of software program executables.

SUMMARY

This present invention comprises of a novel approach for software processor-implemented method such that, when used and integrated with software programs, the audit/log messages are protected during software program source code development, while embedded in software program executables, and during runtime execution of executables.

This invention can improve the confidentially of software audit/log messages and hence prevent the disclosure of software program critical and sensitive information associated with audit/log messages.

BRIEF DESCRIPTION OF THE DRAWINGS

FIG. 1 provides some embodiments of the present invention as illustrated as examples to represent audit/log message in terms of id=value pairs, to show how software programs can use an API function with audit/log message id, text argument and integer argument, and to show how a method can generate a readable and formatted audit/log message output.

FIG. 2 comprises a processor-implemented method that shows the data flow: for software programs that use API functions to read/store configuration data; for API functions used in software program executables to read/store fixed size storage data, to read/store fixed size circular queues storage data, and to store Output Storage data; and for a method (e.g., Browser) to read/store readable output data.

OTHER REFERENCES

C Programming Language, 2nd Edition, Brain W. Kernighan, Dennis M. Richie

DETAILED DESCRIPTION

This description covers:
possible examples on how to use the processor-implemented method in software programs
detailed explanations on how the method protects audit/log messages when used during the development of software programs, when used in the generation of software program executables, and when used during the runtime execution of software program executables.

Referring to FIG. 1, the following describes possible examples of the processor-implement method:

1. Example 1 comprises of methods to represent software program audit/log messages as id=value pairs where the id element is an alphanumeric and the value element is a string text:

STR1="Could not find % s employment information, try your request again in % d minutes"

The value element is defined as a string that is derived from the C-Programming Language printf ( ) style string format specification. This string format specification comprises of string texts and string format specifiers. As shown with the STR1 value above, the string value comprises of all the text in the string which also includes the string specifiers % s and % d.

2. Example 2 comprises of methods that, when used in software programs as an API function, the id element and arguments can be used to generate audit/log messages. The API function call below uses STR1 id to represent the value element of the id=value pair, and "John Doe" and 30 as arguments associated with the STR1 value element string specifies % s and % d:

LoggerLogMsg(STR1, "John Doe", 30)

The argument "John Doe" is associated with the string specifier % s and the argument 30 is associated with the string specifier % d.

3. Example 3 comprises of a method to construct and generate a formatted and readable output message of the API function call in Example 2:

"Could not find John Doe employment information, try your request again in 30 minutes."

The STR1 value string specifier % s is replaced with argument "John Doe" and the specifier % d is replaced with argument 30.

As shown in FIG. 2 and described in detail below, the processor-implemented method comprises of methods to: initialize configuration data, separate the id=value pair so that the id and value elements can be used independently, initialize the fixed size storage data and the fixed size circular queues storage data to be used during runtime execution of software program executable, continuously store fixed size storage data and fixed size circular queues data to Output Storage, and generate readable and formatted audit/log messages.

1. FIG. 2, Item-1 configuration data: Method to initialize the configuration data:
   represent software program audit/log messages as id=value pairs
   store id=value pairs as configuration data
   encrypt the configuration data
   use the protected configuration data during the development of software program
2. FIG. 2: Item-2: Method to separate the id and value elements so that they can be used independently:
   read the configuration data
   separate the id=value pairs into an id elements and a corresponding value elements
   during the development of the software program the id element will be included in the API function to generate audit/log messages
   during development of the software program the corresponding value element will not be included, and therefore, the value element cannot be extracted from the software program
   use the software program to generate the software program executable
   during the generation of software program executable, the corresponding value element will not be used, and therefore, the value element is not embedded in the executable and cannot be extracted from the executable and during the runtime execution of the software program executable
3. FIG. 2, Item-3: Method to initialize the fixed size storage data during runtime execution of software program executable:
   define a size value and use that size value to create the fixed size storage
   read the configuration data, and encode the id=value pairs and store as unique non-duplicate data in the fixed size storage data
   encrypt the fixed size storage data
   during runtime execution of the software program executable the fixed size storage data is protected
4. FIG. 2, Item-3: Method to initialize the fixed size circular queues storage data during runtime execution of software program executable:
   define a size value and use that size value to create the fixed size circular queues storage
   use the id element of the id=value pair to identify the corresponding value element string
   parse the corresponding value element string to find the string format specifiers type for the software program value element string argument(s). For example, the % s and % d string specifiers are used to determine that there are two audit/log arguments included in the LoggerLogMsg( ) API function call, which, in FIG. 1 Example 3, are the text "John Doe" and the integer 30
   extract the audit/log arguments from the API function (e.g., "John Doe" and 30)
   encrypt the audit/log arguments
   store the audit/log argument(s) in the fixed size circular queues storage data
   during runtime execution of the software program executable the fixed size circular queues storage data is protected
5. FIG. 2, Item-2: Method to continuously save fixed size storage data and fixed size circular queues storage data:
   define a threshold value that represents how much audit/log messages are expected to be stored in the fixed size storage and fixed size circular queues storage
   prevent loss of data by continuously monitor the threshold value against the amount of audit/log messages in the fixed size storage and fixed size circular queues storage
   automatically save the fixed size storage data and fixed size circular queues storage data to Output Storage when the current amount of audit/log messages reaches the expected threshold value
   during runtime execution of the software program executable the fixed size storage data and fixed size circular queues storage data are protected in Output Storage
6. FIG. 2, Item-4: Method to generate readable and formatted audit/log messages:
   read the fixed size storage data and fixed size circular queues storage data in the Output Storage
   decrypt the fixed size storage data and fixed size circular queues storage data
   decode the fixed size storage data and fixed size circular queues storage data
   store the readable and formatted audit/log message output.

What is claimed:

1. A processor-implemented method for ensuring the protection of a plurality of software program log messages during the development of software programs, the generation of software program executables, and the runtime execution of the software program executables, comprising of the following steps:
   represent the plurality of software program log messages in terms of a plurality of id=value pairs and arguments;
   decompose the plurality of id=value pairs and arguments;
   protect the plurality of id=value pairs and arguments;
   use a plurality of id elements and arguments to generate the plurality of software program log messages;
   use a plurality of value elements to extract arguments from the plurality of software program log messages; and
   prevent loss of the plurality of software program log messages.

2. The method of claim 1, wherein the plurality of id elements are alphanumeric, the plurality of value elements are string text, and the arguments are text or numeric; and
   wherein the string text is derived from the C-Programming Language printf( ) style string format specification that comprises string texts and string format specifiers.

3. The method of claim 2, further comprising:
   decomposing the plurality of id=value pairs and arguments into separate id elements, value elements, and arguments text and numeric.

4. The method of claim 3, further comprising:
   storing the plurality of id=value pairs and arguments as protected configuration data to be used during the development of software programs.

5. The method of claim 3, further comprising:
   storing the plurality of id elements, the plurality of value elements, and the arguments text and numeric as encoded unique non-duplicate data in a protected fixed size storage to be used during the runtime execution of the software program executables.

6. The method of claim 5, further comprising:
using id elements to identify a corresponding value elements string, and arguments text and numeric, during the runtime execution of the software program executables.

7. The method of claim 6, further comprising:
parsing the corresponding value elements string to identify the printf ( ) style string format specifier types associated with a corresponding software program log message and arguments text and numeric.

8. The method of claim 7, further comprising:
extracting the value element associated with the id element from the corresponding software program log message and arguments text and numeric.

9. The method of claim 8, further comprising:
storing the id element, the value element associated with the id element, and arguments text and numeric in a protected fixed size circular queue storage during the runtime execution of the software program executables.

10. The method of claim 9, further comprising:
establishing a threshold value that represents the expected amount of data stored.

11. The method of claim 10, further comprising:
continuously monitoring when the amount of data currently stored reaches the threshold value.

12. The method of claim 11, further comprising:
saving data to ensure that the plurality of software program log messages are not lost.

13. The method of claim 3, further comprising:
using the plurality of id elements and the arguments text and numeric during the development of software programs.

14. The method of claim 13, further comprising:
using the developed software programs during the generation of the software program executables.

* * * * *